(12) United States Patent
Hong et al.

(10) Patent No.: US 8,951,462 B2
(45) Date of Patent: Feb. 10, 2015

(54) METHOD FOR MANUFACTURING POROUS CERAMIC BODIES WITH GRADIENT OF POROSITY

(75) Inventors: Kug Sun Hong, Seoul (KR); Ki Tae Nam, Seoul (KR); Hae Lin Jang, Seongnam-si (KR); Kyoung Suk Jin, Bucheon-si (KR); Jingming Xu, Providence, RI (US); Tae-Youl Yang, Seoul (KR); Jimin Park, Seoul (KR); Hui-Yun Jeong, Daegu (KR)

(73) Assignee: SNU R&DB Foundation (KR)

( * ) Notice: Subject to any disclaimer, the term of this patent is extended or adjusted under 35 U.S.C. 154(b) by 311 days.

(21) Appl. No.: 13/526,607

(22) Filed: Jun. 19, 2012

(65) Prior Publication Data

US 2013/0307177 A1    Nov. 21, 2013

(30) Foreign Application Priority Data

May 18, 2012    (KR) ........................ 10-2012-0053291

(51) Int. Cl.
    *C04B 35/645*    (2006.01)
(52) U.S. Cl.
    CPC ..................................... *C04B 35/645* (2013.01)
    USPC ......................................................... 264/603

(58) Field of Classification Search
    CPC .. C04B 33/326; C04B 35/645; C04B 35/6455
    See application file for complete search history.

(56) References Cited

U.S. PATENT DOCUMENTS

| 7,699,903 B2 | 4/2010 | Stobbe et al. |
| 2004/0247855 A1 | 12/2004 | Kinemuchi et al. |
| 2005/0100578 A1 | 5/2005 | Schmid et al. |
| 2006/0121609 A1 | 6/2006 | Yannas et al. |
| 2009/0074832 A1 | 3/2009 | Zussman et al. |
| 2011/0097259 A1 | 4/2011 | Del-Gallo et al. |

FOREIGN PATENT DOCUMENTS

| JP | 07062470 | 3/1995 |
| JP | 2001206787 | 7/2001 |
| KR | 1020050095395 | 9/2005 |

*Primary Examiner* — Joseph S Del Sole
*Assistant Examiner* — Russell Kemmerle, III
(74) *Attorney, Agent, or Firm* — Cantor Colburn LLP (57) ABSTRACT

Provided is a method of manufacturing porous ceramic bodies with gradient of porosity, in which a gradient that is continuous to a pore size and porosity is precisely controlled in a simple way. The method includes the steps of: obtaining molded bodies by pressurizing and molding a mixture of powder obtained by mixing ceramic powder and polymer powder at a weight ratio of 1:1 to 100:1; and obtaining sintered bodies with gradient of porosity by sintering the molded bodies while applying a gradient pressure to the molded bodies.

11 Claims, 6 Drawing Sheets

FIG. 1

Planar view of chicken bone

Cross sectional view of chicken bone

METHOD FOR MANUFACTURING POROUS CERAMIC BODIES WITH GRADIENT OF POROSITY

CROSS-REFERENCE TO RELATED APPLICATION

This application claims the benefit of Korean Patent Application No. 10-2012-0053291, filed on May 18, 2012, in the Korean Intellectual Property Office, the disclosure of which is incorporated herein by reference.

BACKGROUND OF THE INVENTION

1. Field of the Invention

The present invention relates to a method of manufacturing porous ceramic bodies, and more particularly to a method of manufacturing porous ceramic bodies with gradient of porosity, in which a gradient that is continuous to a pore size and porosity is precisely controlled in a simple way, to thus be applicable for the porous ceramic bodies.

2. Description of the Related Art

The higher a plant grows, the smaller the diameter of the vessel of the plant becomes. At the highest portion of the plant, the diameter of the vessel is reduced to a nanoscale extent in size, to thus show powerful capillary action. In addition, when water evaporates due to evapotranspiration, a pressure difference occurs between the roots of the plant and the other parts thereof such as flowers, leaves and stems, which is also a big factor to help the roots take up water.

Meanwhile, the animal's circulatory system also forms a similar structure to that of the plant. This is interpreted as a phenomenon that biological solutions move in tiny capillary vessels by the Starling equation. In addition, when cells absorb biological solutions, capillary suction occurs, to thereby enable tiny capillary vessels to take up the biological solutions.

Figure 1:
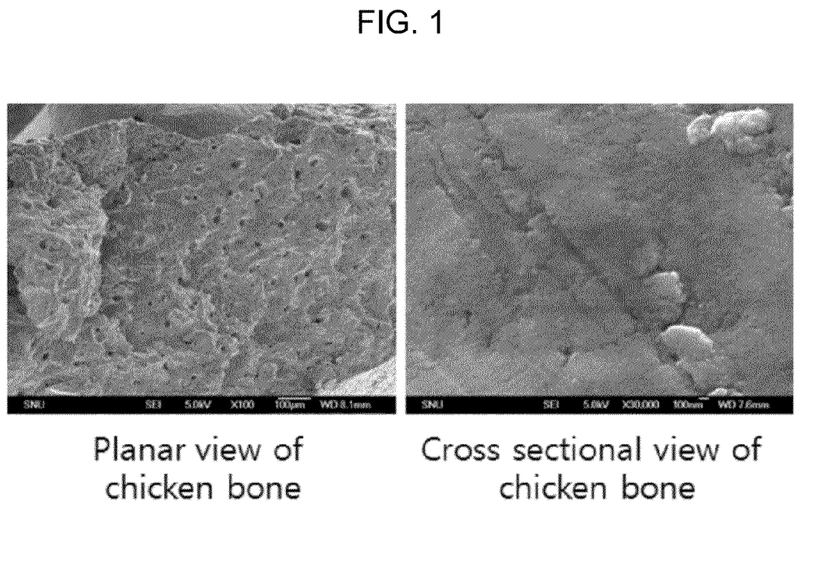
FIG. 1 shows FESEM (Field Emission Scanning Electron Microscope) images with a planar view and a cross-sectional view of a washed chicken bone.
Figure 2:
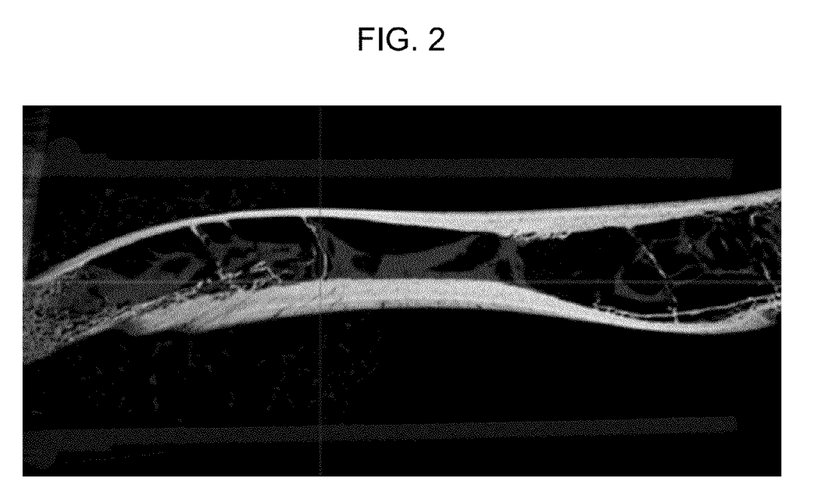
FIG. 2 shows a micro-Computed Tomography (CT) image of the chicken bone of FIG. 1.

FIG. 1 shows FESEM (Field Emission Scanning Electron Microscope) images with a planar view and a cross-sectional view of a chicken bone. FIG. 2 shows a micro-Computed Tomography (CT) image of the chicken bone of FIG. 1. In fact, bones of creatures have a structure that external and internal pores are interconnected with one another via pathways, and such a structure can be found in the FIGS. 1 and 2 images. However, unlike birds, the bones of human beings have a gradient porous structure with gradient of porosity in which the outside of each bone has a high density and the inside of each bone has a low density in the form of a sponge.

In general, since porous ceramics have excellent thermal shock resistance and excellent insulating properties, they can complement problems such as wear of bones and a difference in intensity thereof that are exposed at the time of using existing bone implants. In the case of the existing bone implants, surfaces of ceramics are oxidized to improve biocompatibility, but this oxidizing process is only a surface treatment. As a result, although it is the limit that cells do not grow to the inside of the implants, porous ceramics exhibit an excellent performance at the time of inducing bone regeneration because blood vessels or bone cells are easily harmonized into a porous structure.

However, unless the porous structure is precisely controlled, the mechanical strength becomes weak. Thus, the optimal conditions should be found by controlling porosity and a gradient of pores. Ceramics whose porosity is well-controlled prevent progression of cracks, to thus have high intensity and excellent resistance in comparison with ordinary materials.

A method of mixing and sintering powder or fiber with a difference in density or a tape-casting method is available as a conventional method of manufacturing ceramic bodies with gradient of porosity. However, it is not easy to control processing steps that are applied for the method of manufacturing ceramic bodies, and it is limited to obtain a continuous gradient.

A technology of implementing gradient of porosity by sequentially stacking porous plates with respectively different porosities was disclosed in U.S. Patent Application Publication No. 2005/0100578. In this case, boundary-surfaces that are formed by tying plates may be separated and chipped away from the sequentially stacked plates. In addition, a technology of forming a porous structure by mixing ceramic powders of different sizes and then melting some powders through a heat treatment process was disclosed in U.S. Pat. No. 7,699,903. However, it was still insufficient to form a continuous gradient of porosity.

Meanwhile, U.S. Patent Application Publication No. 2011/0097259 discloses a technology of mixing sponge and ceramic slurry and then burning the sponge during performing a heat treatment process. However, it has a disadvantage that it is difficult to control the sponge precisely on a nanoscale basis. U.S. Patent Application Publication No. 2009/0074832 proposed implant devices of gradient of porosity that was manufactured through an electrospinning method. However, there were defectives that polymer implant devices offered a low intensity and the electrospinning method was not suitable for mass production. U.S. Patent Application Publication No. 2006/0121609 proposed a method of forming pores through a sublimation process of moisture during lyophilizing (that is, freeze-drying) a slurry. However, as recommended in the U.S. Patent Application Publication No. 2006/0121609, only those who have a well-trained skill were able to control pores to be formed. Thus, it had a disadvantage of leading to poor reproducibility and disadvantageous mass production.

In addition, U.S. Patent Application Publication No. 2004/0247855 or Japanese Patent No. 07-062470 proposed a method of manufacturing ceramic foam with gradient of porosity in heterogeneous catalysis through a centrifugation method. However, there was a difficulty that an accurate technology for rheology and mass transfer of slurry during drying in order to obtain a desired shape was needed. This technology was far from applications for bone implants.

Korean Laid-open Patent Publication No. 2005-0095395 proposed a method of manufacturing ceramic bodies with gradient of porosity, which includes the steps of: controlling a mixture ratio of several types of ceramics and powder for controlling pores, to thus obtain the mixed powder; adding binders to the mixed powder to thus manufacture a number of loads having respectively different porosity to then perform incorporation; and undergoing an extrusion, fat removal, and sintering process. However, gradient of porosity is not continuous, a process is cumbersome, and materials of different properties are attached each other to then be sintered again, thereby causing cracks to be easily formed on junction surfaces.

In addition, Japanese Laid-open Patent Publication No. 2001-206787 disclosed a method of manufacturing porous sintered bodies formed of calcium phosphate series whose porosity is distributed in a continuous gradient of 5-85%. Here, according to a technology of manufacturing the porous sintered bodies, powder of calcium phosphate series is dispersed in an organic solvent to thus manufacture slurry, calcium phosphate bodies are manufactured by crosslinked polymerization by adding a foaming agent to the slurry, the calcium phosphate bodies are put and sintered one upon another several times or are made to rotate, to thereby make porosity lowered as it goes from the center of the calcium phosphate bodies to the outside thereof. However, this method uses organic solvents and other additives, to thus cause impurities that may remain after the end of the process harmful to human bodies, make the process complicated and make it difficult to precisely control gradient of porosity.

SUMMARY OF THE INVENTION

To solve the above conventional problems or defects, it is an object of the present invention to provide a method of manufacturing porous ceramic bodies in which gradient of porosity is formed during sintering through a simple process.

It is another object of the present invention to provide a method of manufacturing porous ceramic bodies in which a capillary phenomenon is made to happen through gradient of porosity, to thus effectively take up a biological solution or nutrients, to thereby heighten affinity with respect to tissues of a human body, and to thus greatly contribute to growth of cells to then be applied to structural materials of the human body such as artificial bones or implants.

To achieve the above objects, the present invention provides a method of manufacturing porous ceramic bodies, the method comprising the steps of:

obtaining molded bodies by pressurizing and molding a mixture of powder obtained by mixing ceramic powder and polymer powder at a weight ratio of 1:1 to 100:1; and obtaining sintered bodies with gradient of porosity by sintering the molded bodies while applying a gradient pressure to the molded bodies.

ADVANTAGEOUS EFFECTS

As mentioned above, according to the present invention, a method of manufacturing ceramic bodies with gradient of porosity while giving a gradient pressure is provided to thus enable the given gradient, pressure to be precisely controlled and to thereby easily control a pore size.

In addition, porous ceramic bodies manufactured by the method according to the present invention can smoothly supply nutrients and biological solutions that induce growth of cells, based on a material with excellent affinity with living body tissues, to thus be applied to living body materials such as artificial bones or implants.

In addition, the present invention employs a simple pressure supply method, to thus be usefully applied for mass production of ceramic bodies with gradient of porosity.

DETAILED DESCRIPTION OF THE INVENTION

The above and/or other objects and/or advantages of the present invention will become more apparent by the following description.

In the present invention, a weight ratio of ceramic powder and polymer powder is limited from 1:1 to 100:1. In the case that ceramic powder content is too small beyond this range, porosity becomes too high. As a result, it is difficult to maintain skeletons as molded bodies, to thereby cause a problem of actual applicability. In contrast, in the case that, ceramic powder content is too large beyond this range, porosity becomes too low. As a result, it is difficult to implement a function of a porous structure.

In the present invention, the ceramic powder is at least one selected from the group consisting of calcium phosphate series compounds, alumina, zirconia, silica, zeolite, cordierite and mullite.

In addition to calcium phosphate series compounds similar to bone constituents, alumina has excellent mechanical properties and corrosion resistance and thus has been widely used as bio-structural ceramics, and zirconia also has excellent toughness and impact resistance and thus has been widely used as bio-structural ceramics. Silica has mechanical, thermal and chemical stabilities as a widely-known biocompatible material, and zeolite is safe even in a human digestive system, and has an adsorption property and an ion exchanging power to thus be mixed with phosphate series compounds and to then be applied to implants. Cordierite is a bio-active material having heat resistance and impact, resistance properties, and mullite is also known to contribute to erosion resistance, oxidation resistance, and stability.

The calcium phosphate series compounds that may be used in the present invention is not particularly limited, but may be any one selected from the group consisting of hydroxyapatite (HAP), tricalcium phosphate (TCP) ($Ca_3(PO_4)_2$, and whitlockite (WH) ($Ca_{18-y}X_yH_2(PO_4)_{14}$) where X is a cation substituted for Ca.

Moreover, raw materials provided as calcium (Ca) ions in order to manufacture calcium phosphate series compounds are not limited specifically but for example, may be any one selected from the group consisting of calcium hydroxide, calcium acetate, calcium nitrate, and calcium chloride.

Moreover, raw materials provided as phosphorus (P) ions in order to manufacture calcium phosphate series compounds are not limited specifically but for example, may be any one selected from the group consisting of diammonium hydrogen phosphate, ammonium phosphate, and phosphoric acid.

If conditions are met so that a polymer is mixed with ceramic powder and does not remain in ceramic bodies even after having undergone high temperature heat treatment, to thereby form pores and to thus form a porous ceramic structure, a polymer that is available in the present, invention is not specifically limited to the type. For example, the polymer powder that is available in the present invention may be any one selected from the group consisting of PEG (polyethyleneglycol), PCL (polycaprolactone), PGA (polyglycolic acid), PLLA (Poly-L-lactic acid). PLGA (Poly lactic co glycolide), PMMA (polymethyl methacrylate), PHA (polyhydroxyaikanoate), P4HB (poly-4-hydroxybutyrate), PPF (polypropylene fumerate), and PEG-DMA (polyethyleneglycol dimethacrylate).

It is desirable in terms of productivity to use a gradient pressurization device that has a special structure designed by the present inventor(s) to give a gradient pressure in the present invention. However, if it satisfies a condition that gives the gradient pressure, the present invention is not particularly limited to the gradient pressurization device illustrated in the present invention, but for example, may employ one selected from the group consisting of a right-angled triangular prism shape, a cylindrical shape having a strong pressure as it goes farther from the center of the gradient pressurization device, a cylindrical shape having a strong pressure as it goes closer to the center of the gradient pressurization device, a hollow cylindrical shape having a strong pressure as it goes farther from the center of the gradient pressurization device, and a hollow cylindrical shape having a strong pressure as it goes closer to the center of the gradient pressurization device.

Hereinafter, the present invention will be described more specifically.

Calcium phosphate series ceramic is mixed with a polymer that is ordinarily used to manufacture porous ceramics together with polyethyleneglycol (PEG), and then pressed, to thus obtain molded bodies in a pellet form. Then, the molded bodies is made to undergo a sintering process while applying a gradient pressure to the molded bodies, to thereby manufacture porous ceramic bodies with gradient of porosity.

The calcium phosphate series ceramic is synthesized using a starting raw material providing Ca ions and a starting raw material providing P ions by a liquid phase method in the hydrosphere. For example, $CaOH_2$ and $H_3PO_4$ are made into an aqueous solution of 0.5M, respectively, and then the $H_3PO_4$ aqueous solution is added drop-wise into the $CaOH_2$ aqueous solution, at a 10:6 ratio that is a Ca/P mol ratio of hydroxyapatite (HAP), to thus synthesize a HAP (hydroxy apatite; $Ca_{10}(PO_4)_6(OH)_2$) nano-powder.

The obtained HAP nano-powder is freeze-dried, and then is mixed with a PEG polymer at a weight ratio of from 1:1 to 100:1, in an aqueous solution, and then re-freeze-dried again to thus obtain a mixture of powder in which ceramic powder is mixed with polymer powder. Here, in the case that the PEG polymer lumps depending on particle size distribution, the PEG polymer is mixed with the HAP nano-powder in an aqueous solution to perform a homogeneous mixing operation, hut in the case that the PEG polymer can be mixed sufficiently well with the HAP nano-powder, the PEG polymer powder and the ceramic HAP nano-powder may be mixed at a state where they are all powder or they may be mixed after a small amount of water is added to the PEG polymer in order to release the lumped PEG polymer to a degree.

Then, a mixture of the PEG and HAP powder is put into a mold and then is molded by pressing, to thus obtain molded bodies in a pellet form. In a preferred embodiment of the present invention which will be described later, manufacturing of rectangular cross-sectional shape molded bodies will be described but shape or volume of the molded bodies can be controlled in various forms according to a shape of the mold in the present invention.

Figure 3:
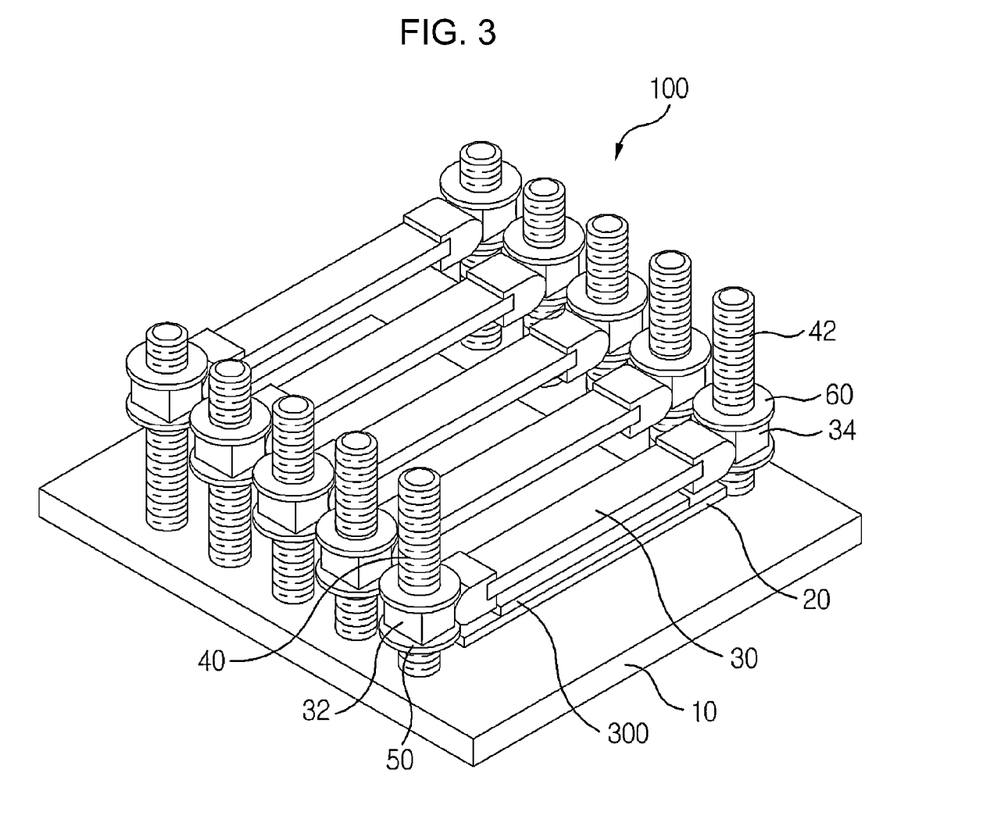
FIG. 3 is a perspective view showing a gradient pressurization device for supplying gradient pressures for ceramic bodies, according to the present invention.

While a gradient pressure is applied to the thus-obtained molded bodies with the gradient pressurization device illustrated in FIG. 3, temperature of the molded bodies is made to rise up slowly up to 1100° C. that is known as an optimum for sintering of HAP and thermally treated. In the case of an environment whose temperature is equal to or more than 900° C. that is typically known as the minimum sintering temperature, similar results can be achieved as a whole. In addition, properties of the ceramic powder differ depending on the type of the ceramic powder that is selected, and thus the sintering temperature that is required differs. Accordingly, of course, it is natural to set an appropriate sintering temperature.

Figure 4:
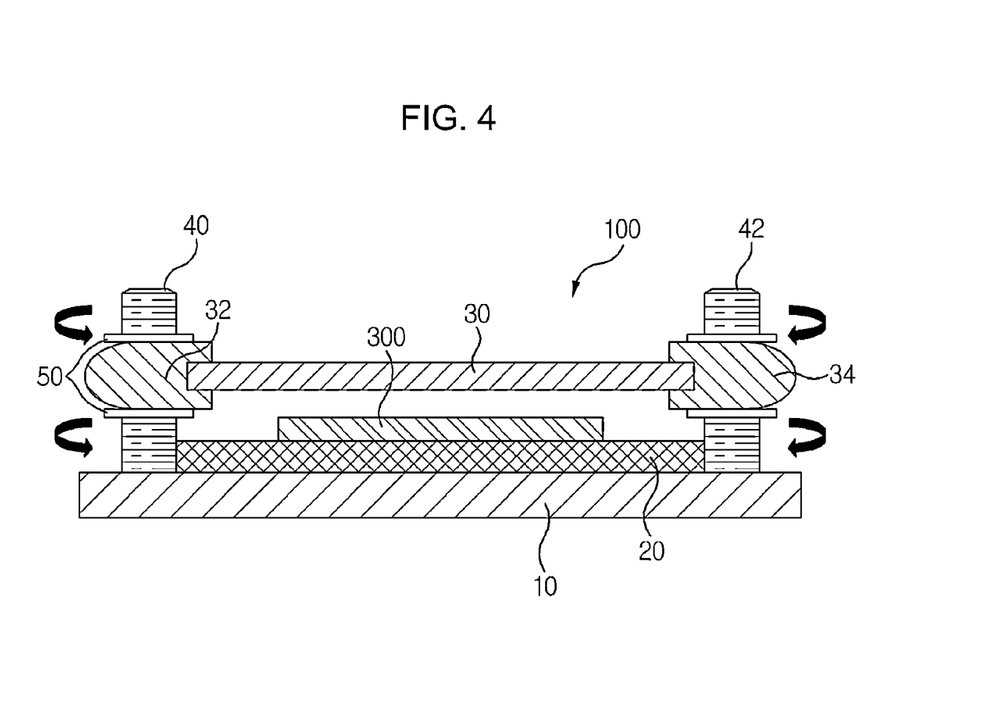
FIG. 4 is a side view of the gradient pressurization device of FIG. 3.

FIG. 3 is a perspective view showing a gradient pressurization device for supplying gradient pressures for a sample of ceramic bodies, according to an embodiment of the present invention. FIG. 4 is a side view of the gradient pressurization device of FIG. 3.

Referring to FIGS. 3 and 4, the gradient pressurization device 100 according to the present invention includes: a base plate 10; a lower plate 20 that, is disposed on the upper surface of the base plate 10 and on which a sample 300 is placed; a plurality of screw bars 40 and 42 that are fixedly erected perpendicularly to both edges of the base plate 10 and arranged at intervals on the base plate 10; an upper plate 30 that is inserted into the respective screw bars 40 and 42 to then be controlled to move up and down and that is closely in contact with the upper surface of the sample 300; and a plurality of pressurization nuts 50 and 60 that are threadedly engaged with the plurality of screw bars 40 and 42, respectively, to thus press the upper plate 30.

It is preferable that the base plate 10 is made of stainless steel having strength capable of supporting the entire gradient pressurization device 100. The upper plate 30 and the lower plate 20 are preferably formed of an alumina material that is suitable for pressing the upper surface and the lower surface of the sample 300 and that can prevent contamination of the sample 300 when the upper plate 30 and the lower plate 20 are directly in contact with the sample 300.

As shown in FIG. 4, the screw bars 40 include a plurality of first screw bars 40 that are arranged on the left side of the base plate 10, and the screw bars 42 include a plurality of second screw bars 42 that are arranged on the right side of the base plate 10.

A first insertion portion 32 that is inserted into each first screw bar 40 so as to move up and down is formed at one end portion of the upper plate 30, and a second insertion portion 34 that is inserted into each second screw bar 42 so as to move up and down is formed at the other end portion of the upper plate 30. The pressurization nuts 50 include a pair of first pressurization nuts 50 that are respectively disposed on the upper and lower surfaces of each first insertion portion 32, and the pressurization nuts 60 include a pair of second pressurization nuts 60 that are respectively disposed on the upper and lower surfaces of each second insertion portion 34.

An operation of the gradient pressurization device 100 as constructive above according to the present invention will follow. A sample 300 is placed between the upper plate 30 and the lower plate 20. Here, a plurality of samples 300 may be respectively placed on the lower surfaces of a plurality of upper plates 30, and the plurality of samples 300 may be placed at regular intervals.

Then, when the first pressurization nuts 50 and the second pressurization nuts 60 are rotated in a tightening direction, respectively, the surface of the sample 300 is pressurized while the upper plate 30 falls down. In this case, when the number of rotations of the respective first pressurization nuts 50 differs from that of the respective second pressurization nuts 60, a gradient pressure can be applied to the sample 300.

As an example, in the case that the first pressurization nuts 50 are rotated by a more number of rotations than the second pressurization nuts 60, the pressurization force of the left side of the sample 300 may become larger than that of the right side of the sample 300 as shown in FIG. 4, to thereby apply a gradient pressure to the sample.

Figure 5:
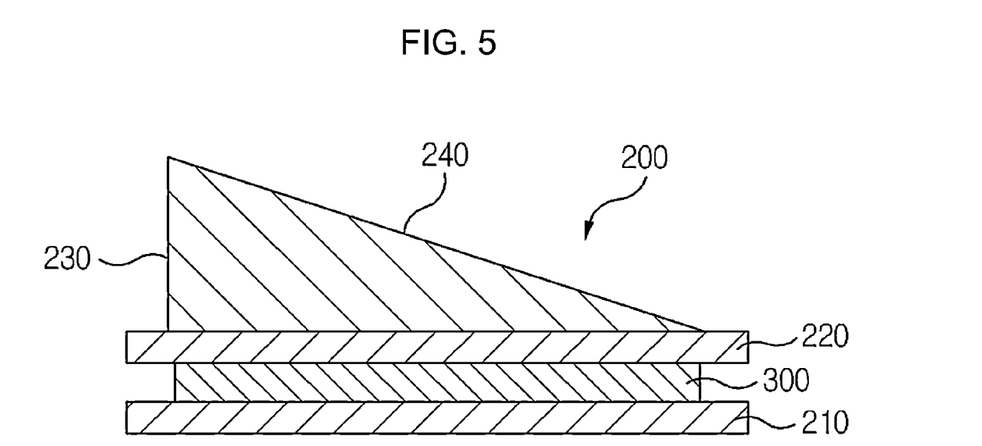
FIG. 5 is a schematic view for explaining a method of applying a gradient pressure to a sample of molded bodies using stainless steel of a right-angled triangular prism shape with a gradient weight, according to another embodiment of the present invention.

FIG. 5 is a schematic view for explaining a method of applying a gradient-pressure to a sample of molded bodies using stainless steel of a right-angled triangular prism shape with a gradient weight, according to another embodiment of the present invention, and is a side view showing a gradient pressurization device 200 according to another embodiment of the present invention.

Referring to FIG. 5, the gradient pressurization device 200 according to another embodiment of the present, invention includes an upper plate 220 and a lower plate 210 that contact the upper and lower surfaces of a sample 300, respectively, and a weight load 230 that is placed on the upper surface of the upper plate 220 and whose upper surface has an inclined surface 240 to give a gradient, pressure to the sample 300.

Here, the upper plate 220 and the lower plate 210 are made of an alumina material that is suitable for pressurizing the upper and lower surfaces of the sample 300, respectively, and that can prevent contamination of the sample 300 when the upper plate 30 and the lower plate 20 are directly in contact with the sample 300.

The weight load 230 is formed with a stainless steel and on the upper surface of which an inclined surface 240 is formed.

In the case of the gradient pressurization device 200, as shown in FIG. 5, a pressing weight is large at the left side of the sample 300 and the pressing weight becomes smaller as it goes toward the right side of the sample 300. As a result, a gradient, pressure is applied to the sample 300.

In other words, the left side portion of the weight load 230 is high, and thus becomes heavier by the height, to thereby apply a more pressure to the sample 300. In contrast, the right side portion of the weight load 230 is low, and thus becomes lighter by the height, to thereby apply a less pressure to the sample 300. As a result, pores in size show up continuously.

Here, the pressure size that is applied to the sample 300 can be adjusted by adjusting inclination of the upper surface of the weight load 230.

The gradient pressurization device according to the present invention can apply gradient pressures to a plurality of samples simultaneously, and can be used with reproducibility advantageously by non-skilled persons.

During the time when temperature rises up in a pressure given environment, PEG and HAP are phase separated. Accordingly, PEG is untied with HAP and then PEG lumps. The polymer is burnt at a higher temperature environment. As a result, a portion where PEG has lumped becomes empty to thus form pores. The greater the pressure effect, may be, the more conspicuous the degree of phase separation may be. Accordingly, the pore size also becomes large. Here, if a simple heat treatment process is undergone without making an action of the pressure, the same result as that of the present invention cannot be obtained.

On the following, an example of the present invention will be described in greater detail. However, the example of the present invention is presented for illustrative purposes only but the present invention is not limited to the example.

Example 1

$CaOH_2$ and $H_3PO_4$ are added into distilled water and then homogeneously mixed to thereby be prepared into a $CaOH_2$ aqueous solution of 0.5M and a $H_3PO_4$ aqueous solution of 0.5M, respectively, and then the $H_3PO_4$ aqueous solution is added drop-wise into the $CaOH_2$ aqueous solution, and precipitated to thus synthesize a HAP (hydroxy apatite; $Ca_{10}(PO_4)_6(OH)_2$) phase. Then, a slurry is separated from the aqueous solution through a filter press and freeze-dried, to thereby obtain pure HAP of a powder state.

HAP and PEG is uniformly mixed at a weight ratio of 4:01 in distilled water, and then a mixture of the HAP and PEG is separated from the solution through the filter press and then freeze-dried, to thus obtain the mixture of the HAP and PEG of a powder state. The mixture of the HAP and PEG of a powder state is put Into a mold to then be pressurized with two tons of pressure, and to thereby obtain pellets of 4.6 cm×0.9 cm×3.4 cm (width×length×height) in a rectangular cross-sectional shape, as molded bodies.

After these molded bodies are put Into the gradient pressurization device of FIG. 3, nuts of two screw bars are tightened so that alumina plates that are an upper plate and a lower plate contact directly the molded bodies. Thereafter, the gradient pressurization device is put into a furnace at a state where a gradient pressure is applied, and heated up to 1100° C. to thereby obtain porous ceramic bodies.

Figure 6:
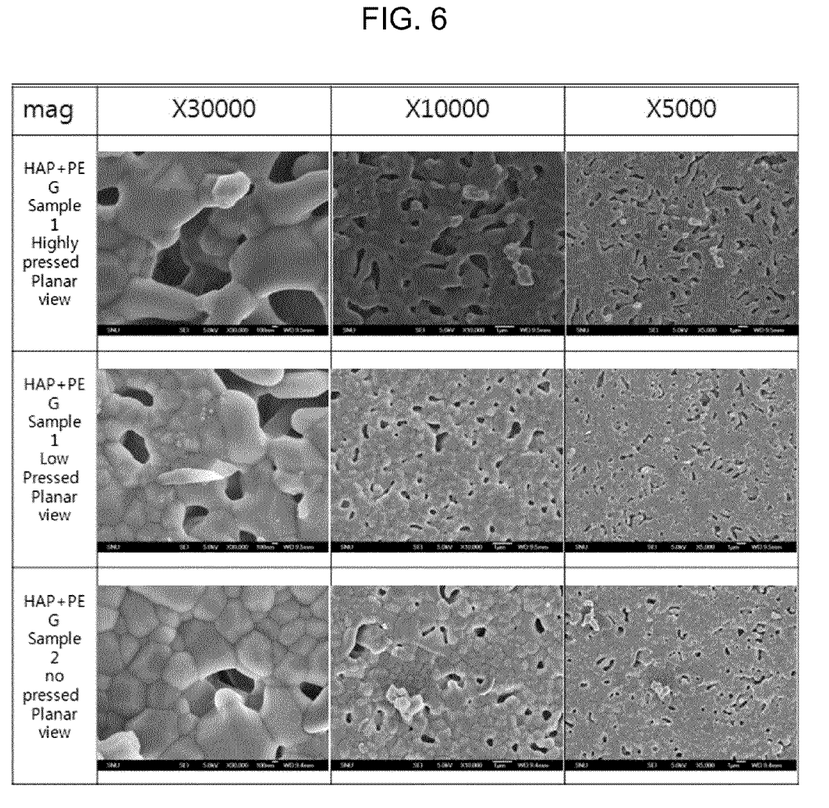
FIG. 6 illustrates photos showing comparison results that are obtained by comparing FESEM (Field Emission Scanning Electron Microscope) image analysis results of a highly pressurized portion and a lowly pressurized portion (sample 1) with those of a non-pressurized portion (sample 2), in the ceramic bodies that are obtained according to the present invention.

FIG. 6 illustrates photos showing comparison results that are obtained by comparing FESEM (Field Emission Scanning Electron Microscope) image analysis results of a highly pressurized portion and a lowly pressurized portion (sample 1) with those of a non-pressurized portion (sample 2), in the ceramic bodies that are obtained according to the present invention.

From the results of FIG. 6, it was observed that porosity was high at the portion where pressure had been strongly applied and pores were large in size. In FIG. 6, sample 1 is sintered bodies prepared by the example of the present invention, and sample 2 is sintered bodies that are not pressurized according to the conventional art for comparison with the present invention.

Figure 7:
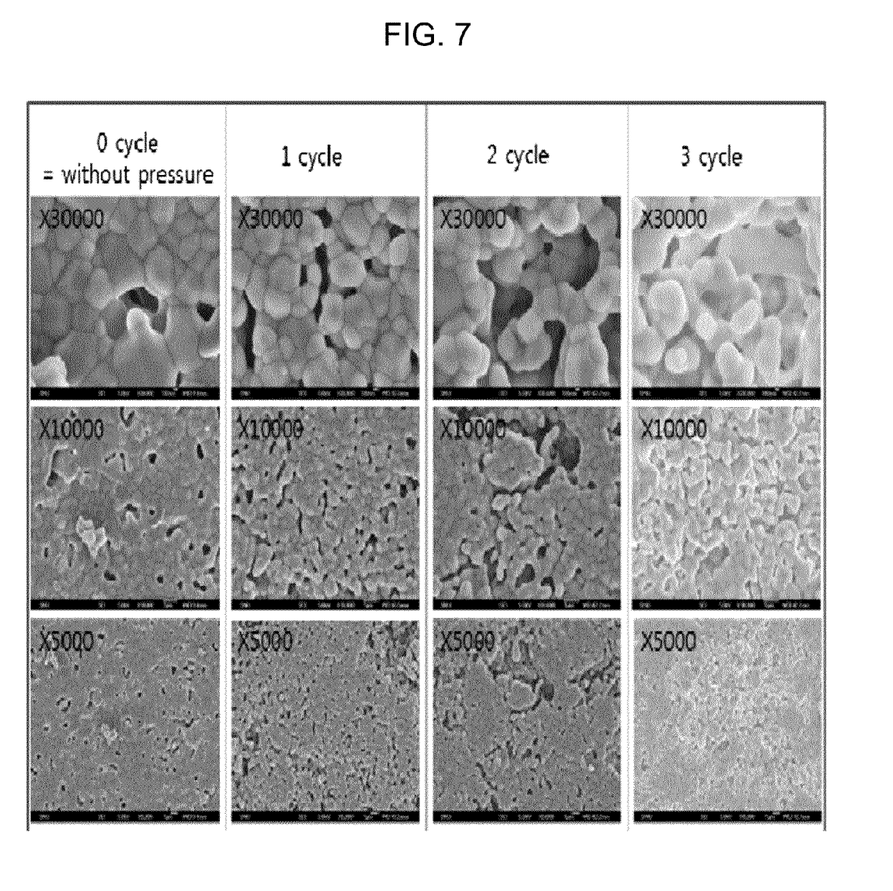
FIG. 7 illustrates photos showing FESEM (Field Emission Scanning Electron Microscope) image analysis results of a variation of gradient of porosity according to a pressure size when a gradient pressure is applied using the gradient pressurization device of FIG. 3.

FIG. 7 illustrates photos showing FESEM (Field Emission Scanning Electron Microscope) image analysis results of a variation of gradient of porosity according to a pressure size in a sample of the sintered bodies prepared by the example 1 of the present invention. In FIG. 7, a cycle means the number of rotations of nuts when the nuts are tightened at a state where alumina plates contact the sample. One cycle means a case that a nut is rotated by 360°. The more the number of rotations of a nut may be, the stronger the degree of tightening the nut may be, which indicates that the applied pressure becomes larger.

From the results of FIG. 7, it was observed that the porosity and pore size became larger proportional to the pressure.

Thus, the gradient pressurization device according to the present invention can control a pressure precisely, to thus enable non-skilled persons to apply a gradient pressure with reproducibility.

Table 1 shows porosity that is calculated by using a J-image program for images of a sample of the sintered bodies obtained by the example 1 of the present invention. Data in Table 1 illustrates porosity as a percentage in which FESEM images of FIG. 7 are obtained, and then a difference in brightness of a pixel is calculated using the J-image program, to thereby discriminate the surface from the pores.

TABLE 1

| | cycle 1 | cycle 2 | cycle 3 | cycle 4 | cycle 5 |
|---|---|---|---|---|---|
| porosity | 8.562% | 12.291% | 13.824% | 15.451% | 34.106% |

As identified from Table 1, it can be seen that porosity increases according to an increase in the number of rotations, that is, an increase in pressure, even with a quantitative numerical value that is obtained by dividing an area occupied by pores by the total area.

Experimental Text Example

Strings were respectively tied at the ends of the lengthy direction of two samples of molded bodies manufactured by the example 1, and then the two samples tied with the strings were suspended and maintained to be erected so that the bottom of each sample is soaked a little in the water. Here, the two samples of the molded bodies with gradient of porosity were tied and suspended with the strings in opposite directions, respectively, in which one was disposed to have large pores at the lower part thereof and the other was disposed to have large pores at the upper part thereof. In addition, water-soluble markers were indicated at an interval of one mm in the lengthy direction of each sample of the molded bodies, and a rate of diffusion of these markers was observed over time, to thereby have compared the degree of moisture absorbed in each sample of the molded bodies. The results are shown in FIG. 8.

Figure 8:
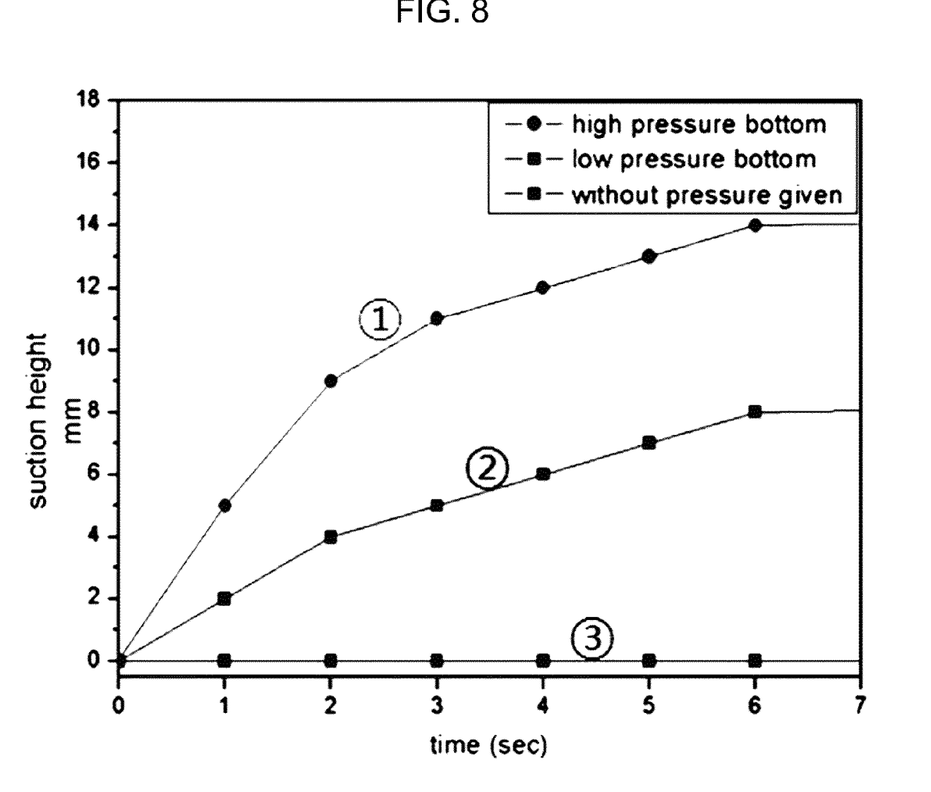
FIG. 8 is a graph showing an extent that moisture is absorbed by a sample of molded bodies that is manufactured according to the embodiment of the present invention by capillary action.

In FIG. 8, among samples of the molded bodies with gradient of porosity, a sample ① is indicated as an upper curve with red circular dots in which a high pressure is given and a portion of large pores in size faces downwards, a sample ② is indicated as a middle curve with black rectangular dots in which a low pressure is given and a portion of small pores in size faces downwards, and a sample ③ is indicated as a lower curve with green rectangular dots in which a uniform pressure is given all over the entire molded bodies for comparison with the present invention.

From the results of FIG. 8, it was confirmed that both the two samples applied with the gradient pressure showed strong capillary actions, respectively. In particular, it was confirmed that the sample marked with the red circular dots showed an excellent capillary action since it could be seen that the sample had an increasing speed of taking up liquid initially, and took up the liquid up to the uppermost part of the sample finally. In contrast, the other sample with no gradient of porosity showed little capillary action.

INDUSTRIAL APPLICABILITY

The porous ceramic bodies manufactured by the method according to the present invention can smoothly supply nutrients and biological solutions that induce growth of cells, based on a material with excellent affinity with living body tissues, to thus be applied to living body materials such as artificial bones or implants.

As described above, the present invention has been described with respect to particularly preferred embodiments. However, the present invention is not limited to the above embodiments, and it is possible for one who has an ordinary skill in the art to make various modifications and variations, without departing from the spirit of the present invention. Thus, the protective scope of the present invention is not defined within the detailed description thereof but is defined by the claims to be described later and the technical spirit of the present invention.

What is claimed is:

1. A method of manufacturing porous ceramic bodies, the method comprising the steps of:
    obtaining molded bodies by pressurizing and molding a mixture of powder obtained by mixing ceramic powder and polymer powder at a weight ratio of 1:1 to 100:1; and
    obtaining sintered bodies with gradient of porosity by sintering the molded bodies while applying a gradient pressure to the molded bodies.

2. The method of manufacturing porous ceramic bodies of claim 1, wherein the ceramic powder is at least one selected from the group consisting of calcium phosphate series compounds, alumina, zirconia, silica, zeolite, cordierite and mullite.

3. The method of manufacturing porous ceramic bodies of claim 2, wherein the calcium phosphate series compounds may be any one selected from the group consisting of hydroxyapatite (HAP), tricalcium phosphate (TCP) ($Ca_3(PO_4)_2$), and whitlockite (WH) ($Ca_{18-y}X_yH_2(PO_4)_{14}$) where X is a cation substituted for Ca.

4. The method of manufacturing porous ceramic bodies of claim 2, wherein raw materials provided as calcium (Ca) ions in order to manufacture calcium phosphate series compounds may be any one selected from the group consisting of calcium hydroxide, calcium acetate, calcium nitrate, and calcium chloride.

5. The method of manufacturing porous ceramic bodies of claim 2, wherein raw materials provided as phosphorus (P) ions in order to manufacture calcium phosphate series compounds may be any one selected from the group consisting of diammonium hydrogen phosphate, ammonium phosphate, and phosphoric acid.

6. The method of manufacturing porous ceramic bodies of claim 1, wherein the polymer powder may be any one selected from the group consisting of PEG (polyethyleneglycol), PCL (polycaprolactone), PGA (polyglycolic acid), PLLA )Poly-L-lactic acid), PLGA (Poly lactic co glycolide), PMMA (polymethyl methacrylate), PDA (polyhydroxyaikanoate), P4HB (poly-4-hydroxybutyrate), PPF (polypropylene fumerate), and PEG-DMA (polyethyleneglycol dimethacrylate).

7. The method of manufacturing porous ceramic bodies of claim 1, wherein the gradient pressure is applied by using a gradient pressurization device including: a base plate; a lower plate that is disposed on the upper surface of the base plate and on which a sample is placed; first and second screw bars that are respectively fixed on both edges of the base plate; an upper plate that has first insertion portions that are respectively inserted into the first screw bars and second insertion portions that are respectively inserted into the second screw bars and pressurizes the upper surface of the sample; first pressurization nuts that are threadedly engaged with the first screw bars, respectively, to thus press the first insertion portions; and second pressurization nuts that are threadedly engaged with the second screw bars, respectively, to thus press the second insertion portions, in which the number of rotations of the first pressurization nuts differs from that of the second pressurization nuts.

8. The method of manufacturing porous ceramic bodies of claim 7, wherein a plurality of the first screw bars are arranged at intervals on the base plate and a plurality of the second screw bars are arranged at intervals on the base plate, to thus apply a gradient pressure to a plurality of samples.

9. The method of manufacturing porous ceramic bodies of claim 7, wherein the upper and lower plates are made of an alumina material, respectively.

10. The method of manufacturing porous ceramic bodies of claim 1, wherein the gradient pressure is applied to a sample through a method of putting a weight load having an inclined surface so that a weight at the upper surface of the upper plate is gradually changed when the sample is disposed between the upper and lower plates.

11. The method of manufacturing porous ceramic bodies of claim 10, wherein the weight load is made of stainless steel.

* * * * *